(12) United States Patent
McClung et al.

(10) Patent No.: US 11,636,491 B2
(45) Date of Patent: Apr. 25, 2023

(54) HYDROGEN FUELING STATION COMMUNICATION

(71) Applicant: Toyota Motor North America, Inc., Plano, TX (US)

(72) Inventors: Mark A. McClung, Frisco, TX (US); Michael C. Edwards, McKinney, TX (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 698 days.

(21) Appl. No.: 16/247,980

(22) Filed: Jan. 15, 2019

(65) Prior Publication Data

US 2020/0226616 A1   Jul. 16, 2020

(51) Int. Cl.
*G06Q 30/00* (2012.01)
*G06Q 30/02* (2012.01)
(Continued)

(52) U.S. Cl.
CPC ......... *G06Q 30/018* (2013.01); *F15B 19/005* (2013.01); *F17C 5/007* (2013.01);
(Continued)

(58) Field of Classification Search
CPC .. G06Q 30/018; G06Q 30/0284; G06Q 20/02; G06Q 20/145; G06Q 2220/00;
(Continued)

(56) References Cited

U.S. PATENT DOCUMENTS 9,598,274 B1 *   3/2017   Criddle ................. G07F 13/025
2005/0056661 A1 *  3/2005   Casamatta ........ H01M 8/04089
                                                                  222/3

(Continued)

FOREIGN PATENT DOCUMENTS

DK       201770360 A1     4/2018
JP        2016183074 A    10/2016
WO   WO-2018052415 A1 *   3/2018   ........... G05D 1/0276

OTHER PUBLICATIONS

Krishna Reddi et al. Impact of hydrogen SAE J2601 fueling methods on fueling time of light-duty fuel cell electric vehicles. International Journal of Hydrogen Energy 42. May 16, 2017. (Year: 2017).*

(Continued)

*Primary Examiner* — Omar Zeroual
*Assistant Examiner* — Carter P Brockman
(74) *Attorney, Agent, or Firm* — Christopher G. Darrow; Darrow Mustafa PC

(57) ABSTRACT

Fueling verification systems and methods for corroboration of vehicle fueling are described herein. The systems and methods provide for verifiable transmission of data collected from a remote source to assure data integrity and maintain proper fuel transmission as part of vehicle fueling. The systems and methods can include collecting a first fuel measure for a fueling process from a delivery source. A second fuel measure can be recorded into a blockchain. The second fuel measure for the fueling process can be received from a recipient source. Then, the first fuel measure and the second fuel measure can be correlated to determine a fueling offset. Then, the delivery source and/or the recipient source can be compensated based on the fueling offset.

17 Claims, 7 Drawing Sheets

(51) Int. Cl.
  G07F 13/02 (2006.01)
  H04L 9/06 (2006.01)
  F17C 5/00 (2006.01)
  F15B 19/00 (2006.01)
  G07C 5/00 (2006.01)
  H04L 9/00 (2022.01)
  G06Q 30/018 (2023.01)
  G06Q 30/0283 (2023.01)

(52) U.S. Cl.
  CPC ......... *G06Q 30/0284* (2013.01); *G07C 5/008* (2013.01); *G07F 13/025* (2013.01); *H04L 9/0637* (2013.01); *F17C 2221/012* (2013.01); *F17C 2250/043* (2013.01); *F17C 2250/0426* (2013.01); *F17C 2265/065* (2013.01); *H04L 9/50* (2022.05); *H04L 2209/84* (2013.01)

(58) Field of Classification Search
  CPC ........ F15B 19/005; F17C 5/007; G07C 5/008; G07F 13/025; G07F 15/04; H04L 9/0637; H04L 2209/38; H04L 2209/84; H04L 63/12; H04L 9/3239; Y02E 60/32
  See application file for complete search history.

(56) References Cited

U.S. PATENT DOCUMENTS

| 2009/0164149 | A1* | 6/2009 | Harrell | G01F 25/0038 702/50 |
| 2014/0195046 | A1* | 7/2014 | Fadler | H04L 9/3226 700/237 |
| 2015/0308621 | A1 | 10/2015 | Mathison | |
| 2017/0074707 | A1* | 3/2017 | Mathison | F17C 5/06 |
| 2017/0103468 | A1 | 4/2017 | Orsini et al. | |
| 2017/0213400 | A1 | 5/2017 | Mathison | |
| 2020/0226559 | A1* | 7/2020 | Boss | H04L 9/0891 |

OTHER PUBLICATIONS

Hua et al., "Apply blockchain technology to electric vehicle battery refueling", Proceedings of the 51st Hawaii International Conference on System Sciences, pp. 4494-4502 (9 pages).

* cited by examiner

HYDROGEN FUELING STATION COMMUNICATION

TECHNICAL FIELD

The subject matter described herein generally relates to hydrogen fueling and, more particularly, coordinating fuel measurement.

BACKGROUND

The safety and convenience of hydrogen tank fueling are among many possible considerations in determining the ultimate success of hydrogen-fueled vehicles in the marketplace. Because of the number of unknown parameters associated with conventional hydrogen tank fueling procedures, the fueling operations tend to be somewhat conservative, thereby sacrificing precision, performance, and efficiency, for safety. Those unknown parameters can be particularly problematic with respect to the end of fill density or state of charge and unnecessary levels of pre-cooling, for an increased safety margin.

SUMMARY

Disclosed herein are systems and methods for communicating and controlling vehicle fueling, such as hydrogen fueling, between the fueling station and the vehicle. In one or more implementations, a fueling verification system for corroboration of vehicle fueling is disclosed. The fueling verification system can include one or more processors, and a memory communicably coupled to the one or more processors. The memory can store a detection module including instructions that when executed by the one or more processors cause the one or more processors to collect a first fuel measure for a fueling process from a delivery source, the first fuel measure being incorporated into a blockchain. The memory can further store a communication module including instructions that when executed by the one or more processors cause the one or more processors to receive a collect a second fuel measure for a fueling process from a recipient source, the second fuel measure being incorporated into the blockchain. The memory can further store an evaluation module including instructions that when executed by the one or more processors cause the one or more processors to compare the first fuel measure and the second fuel measure to determine a fueling offset and to compensate the delivery source and/or the recipient source based on the fueling offset.

In further implementations, a non-transitory computer-readable medium for corroboration of vehicle fueling is disclosed. The non-transitory computer-readable medium can store instructions that when executed by one or more processors cause the one or more processors to collect a first fuel measure for a fueling process from a delivery source, the first fuel measure being incorporated into a blockchain. The non-transitory computer-readable medium can further store instructions to collect a second fuel measure for a fueling process from a recipient source, the second fuel measure being incorporated into the blockchain. The non-transitory computer-readable medium can further store instructions to in response to collecting the second fuel measure, compare the first fuel measure and the second fuel measure to determine a fueling offset. The non-transitory computer-readable medium can further store instructions to compensate the delivery source and/or the recipient source based on the fueling offset.

In further implementations, a method for corroboration of vehicle fueling is disclosed. The method can include collecting, in a blockchain, a first fuel measure for a fueling process from a delivery source. The method can further include collecting, in the blockchain, a second fuel measure for the fueling process from a recipient source. The method can further include, in response to collecting the second fuel measure, comparing the first fuel measure and the second fuel measure to determine a fueling offset. The method can further include compensating the delivery source and/or the recipient source based on the fueling offset.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate only some implementations of this disclosure and are therefore not to be considered limiting of its scope. The disclosure may admit to other equally effective implementations.

To facilitate understanding, identical reference numerals have been used, wherever possible, to designate identical elements that are common to the figures. Additionally, elements of one or more implementations may be advantageously adapted for utilization in other implementations described herein.

DETAILED DESCRIPTION

Figure 1:
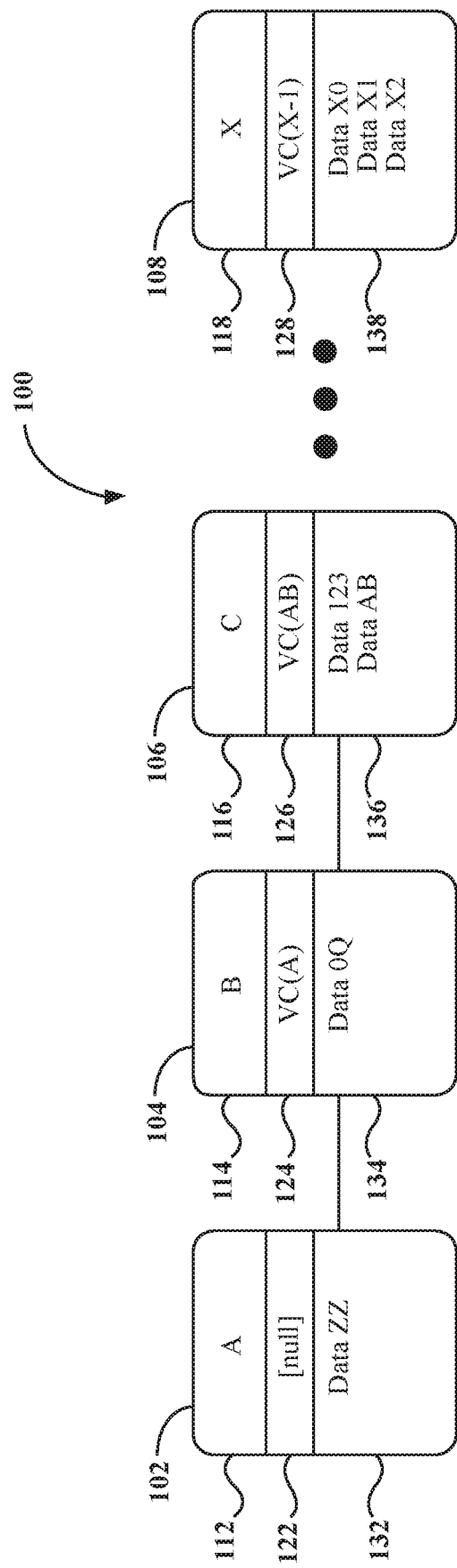
FIG. 1 is an example of a blockchain adaptable for use with a fueling verification system, according to some implementations.

The implementations disclosed herein generally relate to systems and methods for implementing a blockchain to facilitate communications between recipient source(s) (e.g., vehicles) and delivery source(s), such as hydrogen fueling stations. In general, the recipient source(s) may detect and receive different fueling amounts and fueling rates than those detected by the delivery source(s). Differing fueling rates can result in fueling failure(s), such as failure to completely fuel the vehicle, overfill, spillage, or other losses. The fueling verification system described herein can verifiably identify the recipient source(s) and the delivery source(s) and maintain accurate measures of the refueling process.

In one or more approaches as discussed herein, a blockchain is a system that securely and immutably stores data. In general, blockchains create a history of transactions in a series of blocks where each block comprises a mathematical summary, called a hash, of the previous block. Hashing is a form of cryptographic security where a single unique string of a specific size is produced with relation to the information in the blockchain and the individual blocks respectively, making it difficult to reverse or decrypt. The hashes are one-way, meaning non-reversible. Thus, the hashes can make the blockchain secure against tampering. The system uses the relationships between blocks and hashes to form a secure chain where subsequent blocks in a blockchain effectively secure prior blocks through storing the hash/identifier of the prior block while also incorporating the hash as an integral aspect of the current block. The blockchain, in one approach, stores refueling information within blocks of the blockchain, as well as tiered and correlated branches about the recipient source(s), the delivery source(s), connections, locations, and other information relevant to the transaction.

The systems and methods disclosed herein can further apply a blockchain to facilitate secure communications between the delivery source(s) and recipient source(s) because of the inherent tamper resistance and distribution of the blockchain. The recipient source(s) are devices and locations for use in the delivery of fuel to the recipient sources. The recipient source(s) are device and locations which receive fuel from the delivery sources. In some implementations, recipient source(s) can be a delivery source(s), such as a refueling truck receiving fuel in the transfer tank. In further implementations, delivery source(s) can also be recipient source(s), such as a refueling station receiving a fuel shipment in an underground storage tank. By incorporating the information from the fueling process as part of a blockchain, the fueling verification system can produce immutable information related to the fueling process. The immutable information can include identification information and fueling information detected at both the recipient source(s) and the delivery source(s) to provide a more precise determination of failures, verify fueling speed, verify fueling amounts, and other fueling-related indicia or events.

In some examples, the recipient source(s) can initiate a fueling process with the delivery source(s) by connecting a fuel line and starting the flow of fuel. The system can then collect measurements of the fueling process during a fueling transaction and add these measurements to the blockchain. The measurements and other data can be collected from the perspective of the recipient source(s) for incorporation into a block for the blockchain. The block can further include the vehicle ID, the station ID, a current fill level, fueling component versions, and other information or data related to the fueling event. The recipient source(s) can then transfer the block or otherwise make the block available to members of the network, including the delivery source(s). The delivery source(s) can receive the block, verify the block, and incorporate the block as part of the blockchain. The delivery source(s) can, in a similar fashion, collect measurements of the fueling process during a fueling transaction and add these measurements to the blockchain. The measurements and other data can be collected from the perspective of the delivery source(s) for incorporation into a block for the blockchain. Thus, the system and methods described herein incorporate blocks into the blockchain which have a verifiable code related to the previous data in the blockchain. Consequently, the blockchain can be used to secure communications between the recipient source(s) and the delivery source(s), such that the measurements from each source can be trusted and stored in a secure, distributed, and immutable fashion.

The recipient source(s) and the delivery source(s) can incorporate the information into a block, create a verification code, and upload the block as the information is collected. Thus, the system and methods described here can create a real-time or near real-time availability of comparative information from the fueling process. As used herein, the term "real-time" means a level of processing responsiveness that a user or system senses as sufficiently immediate for a particular process or determination to be made, or that enables the processor to keep up with some external process. Both the recipient source(s) and the delivery source(s) can upload blocks of information in real-time about the progress of the fueling during the fueling process. The real-time collection of fueling information by the fueling verification system allows for continuous comparison of the delivery source fueling measurements with recipient source fueling measurements. In some implementations, the systems and methods can utilize the real-time information to form a feedback loop that is facilitated by the blockchain. As the blocks are uploaded, the system can compare to detect differences between the data which indicate failures or improper readings at the recipient source(s) or the delivery source(s). Real-time reliable measurements allow reliable comparisons to identify problems in the measurement and delivery of fuel, which can ensure expedient repair of defective parts and ensure the recipient source(s) are properly refueled.

In further implementations, the information from the vehicle is anonymized through the blockchain and stored as a record of the fueling event. The systems and methods can remove identifying information from the information used in generating the blocks in the blockchain, such that the information is generally related to either the recipient source(s) or the delivery source(s). This information can then be used to perform analytics for identifying problems and/or other useful information about hydrogen fueling. In some implementations, the information can be used as an automated form of crowdsourcing to determine general events or problems with the delivery source(s), such as which of the delivery source(s) are presently online, which delivery source(s) are experiencing problems, the relative fueling load on a delivery source(s) (e.g., number of recipient source(s) waiting in queue), and so on. This information can be provided through a network, such as via the cloud, to other recipient source(s) (e.g., hydrogen-fueled vehicles). Information provided to said recipient source(s) can inform those recipient source(s) which locations are available for fueling. In further implementations, the fueling verification system can be used by the recipient source(s) to reserve a position (e.g., queue) for fueling at a selected fueling station. The implementations disclosed herein are more clearly described with reference to the figures below.

FIG. 1 depicts an example of a blockchain 100, according to some implementations. Each subsequent block in the blockchain 100 generally includes a block ID, verification code, and a data field. The blocks, as identified by the block ID, can include a data field. The data field can hold the data elements, such as the fuel measurements of the fueling verification system. Once the system has added the desired data for that block, the system generates a verification code from the data in the block and one or more subsequent blocks. The system can generate the verification code from data in the block, such as data in the data field. The verification code thus represents the data as stored, which makes that data unable be changed or altered without the alteration being recognized.

The exemplary blockchain 100 starts with block A 102. Block A 102 includes a block ID 112, a verification code field 122, and a data field 132. The block ID 112 is a sequence which identifies the block A 102. The block ID 112 can be a unique sequence with respect to the other blocks in the blockchain 100. The block A 102 can further include the verification code field 122. The verification code field 122 can store a verification code. The verification code can be a unique sequence which is mathematically generated using the previous block as an input. The verification code can be a hash, chameleon hash, or others which represent the data as stored. The verification codes presented here are for exemplary purposes and are not intended to be limiting of possible size or permutations of the verification sequences in the blocks of the blockchain 100. As the block A 102 is the first block in the blockchain 100, the verification code field 122 can be empty. In further examples, the verification code field 122 has a verification code generated based on the data only in the block A 102 or using other identifying factors, such as time stamp or data origin. The data field 132 can be a generic sequence of digital input from a variety of sources. The data field 132 can further be of varying sizes, as limited by the block size of the blockchain 100, including being empty.

Block B 104 includes a block ID 114, a verification code field 124, and a data field 134. The block ID 114 can be substantially similar to the block ID 112. The block B 104 further has a verification code VC(A), in the verification code field 124. The verification code is generated from the content of previous block A 102, which serves as an input for generation of the verification code. The content of block A 102 used in the determination of the verification code VC(A) can include any or all of the fields within block A 102, such as data ZZ in the data field 132, the [null] verification code in the verification code field 122, or the block ID 112. The data field 134 of the block B 104 may be used to store any type of data. For example, the data field 134 can hold account data, version data, links, pointers, archived data, currency value, personal data, contract terms, transaction data, documents, other data, or combinations thereof.

The blocks of the blockchain 100 can be locked to one another via the verification codes. In one sense, the blocks are locked to one another with respect to the verification code, because the verification codes in each of the blocks are generated including the content in one or more of the previous blocks at the time the verification code was generated. As such, modifications to a previous block after a current block is added will create evidence of modification. Specifically, the change will be inconsistent with the verification code as generated using the previous data and stored in the current block. Hence, the content of the respective block is locked once a subsequent block with a generated verification code is added to the blockchain 100.

Block C 106 includes a block ID 116, a verification code field 126, and a data field 136. The block ID 116 can be substantially similar to the block ID 112. In this example, the data field 136 includes Data 123 and Data AB. The block C 106 further has a verification code VC(AB), in the verification code field 124. The verification code is generated from the content of previous block A 102, the previous block B 104, or combinations thereof. The content of block A 102 and block B 104 used in the determination of VC(AB) may include any or all of the fields within block A 102 and block B 104. In further implementations, the verification code in the verification code field 126 can include the previous block (e.g., block B 104) and any further information desired (e.g., any elements of block A 102).

Block X 108 can represent all further blocks in the blockchain 100. Block X 108 includes a block ID 118, a verification code field 128, and a data field 138. Block X 108 can be substantially similar to block A 102, block B 104, block C 106 or combinations thereof. The verification code for the verification code field 128 is generated from the content of previous block A 102, the previous block B 104, the previous block C 106, other blocks, or combinations thereof. The verification code can be generated using data from some blocks while skipping other blocks (e.g., a verification code generated using data ZZ from block A 102, Data AB and the verification code VC (AB) from block C 106, and no data from block B 104). Fields in the blocks (e.g., blocks 102, 104, 106, and 108) that are not used to determine the verification code in subsequent blocks are not necessarily protected by the blockchain 100. For example, you can modify these fields without creating coding inconsistencies between the blocks. In addition, if the verification code field (e.g., verification code fields 122, 124, 126, and 128) is not used when determining the verification code of the next block of the character string, the blockchain does not necessarily guarantee the coding consistency between the above blocks, because the unsafe verification code can be modified without generating evidence of inconsistency.

Thus, in various implementations, at least one secure portion of the verification code field and the data field of the block is used to determine the verification code for the next block (e.g., the subsequent block in the blockchain). In this example of a blockchain, the content of block B 104 may be locked once block C 106, which contains a verification code generated using VC(AB) in verification code field 126, is added to the blockchain 100. As a result, the content of block A 102 which was locked by block B 104 is further secured by block C 106 because block C 106 prevents block B 104 from being changed without producing evidence of tampering. Thus, the blockchain 100 can be used to produce a secure database of the collected data in blocks which are tamper resistant.

Figure 2:
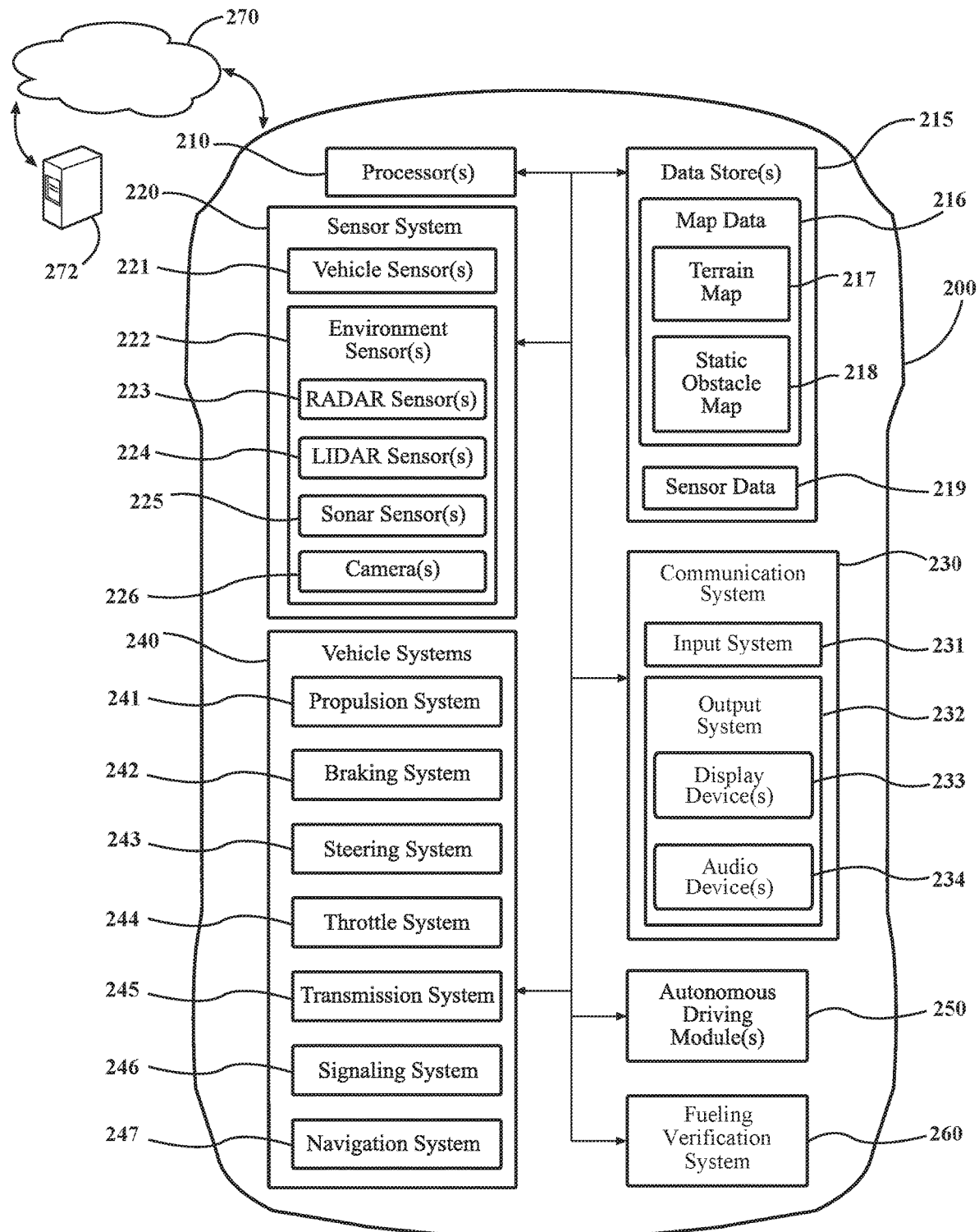
FIG. 2 is a block diagram of a vehicle incorporating a fueling verification system, according to implementations described herein.

Referring to FIG. 2, an example of an autonomous device, specifically a vehicle 200, is illustrated. The vehicle 200 can include a fueling verification system 260 or components and modules thereof. As used herein, a "vehicle" is any form of motorized transport. In one or more implementations, the vehicle 200 can be an automobile. In some implementations, the vehicle 200 may be any other form of motorized transport that, for example, can operate autonomously, semi-autonomously, or manually by an in-vehicle operator. The vehicle 200 can include the fueling verification system 260 or capabilities to support or interact with the fueling verification system 260, and thus benefits from the functionality discussed herein. While arrangements will be described herein with respect to automobiles, it will be understood that implementations are not limited to automobiles, but any form of vehicle or device capable of being occupied. Instances of the vehicle, as used throughout, are equally applicable to any device capable of incorporating the systems or methods described herein.

The vehicle 200 also includes various elements. It will be understood that, in various implementations, it may not be necessary for the vehicle 200 to have all of the elements shown in FIG. 2. The vehicle 200 can have any combination of the various elements shown in FIG. 2. Further, the vehicle 200 can have additional elements to those shown in FIG. 2. In some arrangements, the vehicle 200 may be implemented without one or more of the elements shown in FIG. 2. While the various elements are shown as being located within the vehicle 200 in FIG. 2, it will be understood that one or more of these elements can be located external to the vehicle 200. Further, the elements shown may be physically separated by large distances.

Figure 3:
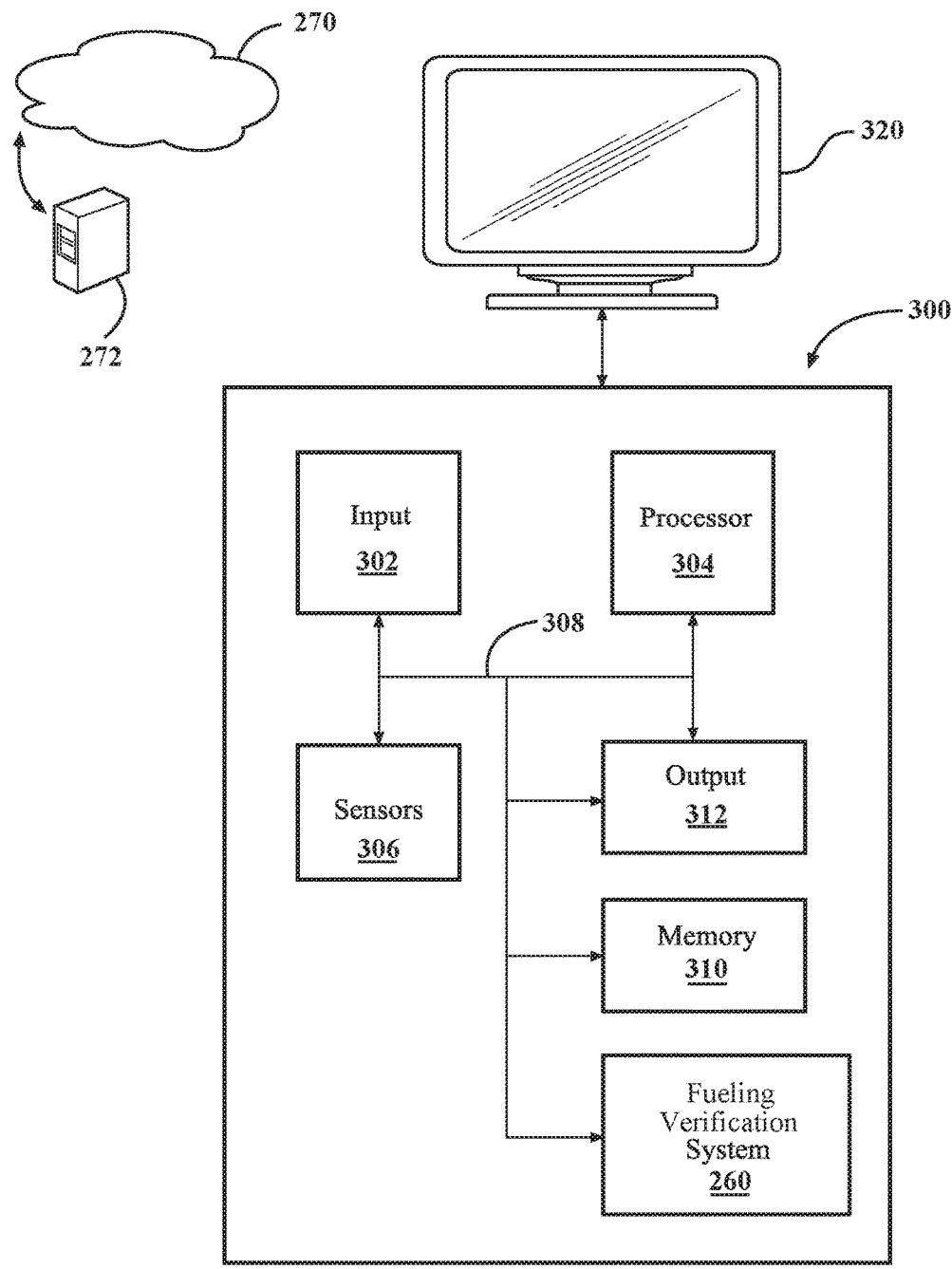
FIG. 3 is a block diagram of a computing device incorporating a fueling verification system, according to implementations described herein.

FIG. 3 is an example of a computing device 300. The computing device 300 can include any programmable electronic device designed to accept data, perform mathematical or logical operations under the control of software. The computing device 300 can include the fueling verification system 260 or capabilities to support or interact with the fueling verification system 260, and thus benefits from the functionality discussed herein. In implementations described herein, the vehicle 200 can be in communication with a computing device 300. The vehicle 200 or other device being in communication with the computing device 300 refers to any forms of direct or indirect communication between the computing device 300 and the vehicle 200, including direct wired communication, communication through one or more intermediary computing devices, communication through the cloud, or combinations thereof. The computing device 300 and the vehicle 200 can communicate through the use of a variety of wired or wireless networks. In some implementations, the computing device 300 is a server which is remote from the vehicle 200. In further implementations, the computing device 300 can be integrated into the vehicle 200, such as an embedded system. The computing device 300 can include a fueling verification system 260 that is implemented to perform methods and other functions as disclosed herein.

Some of the possible elements of the vehicle 200 and the computing device 300 are shown in FIG. 2 and FIG. 3 respectively. These elements will be described herein, along with subsequent figures. However, a description of many of the elements in FIG. 2 and FIG. 3 will be provided after the discussion of FIGS. 4-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the implementations described herein. Those of skill in the art, however, will understand that the implementations described herein may be practiced using various combinations of these elements.

Figure 4:
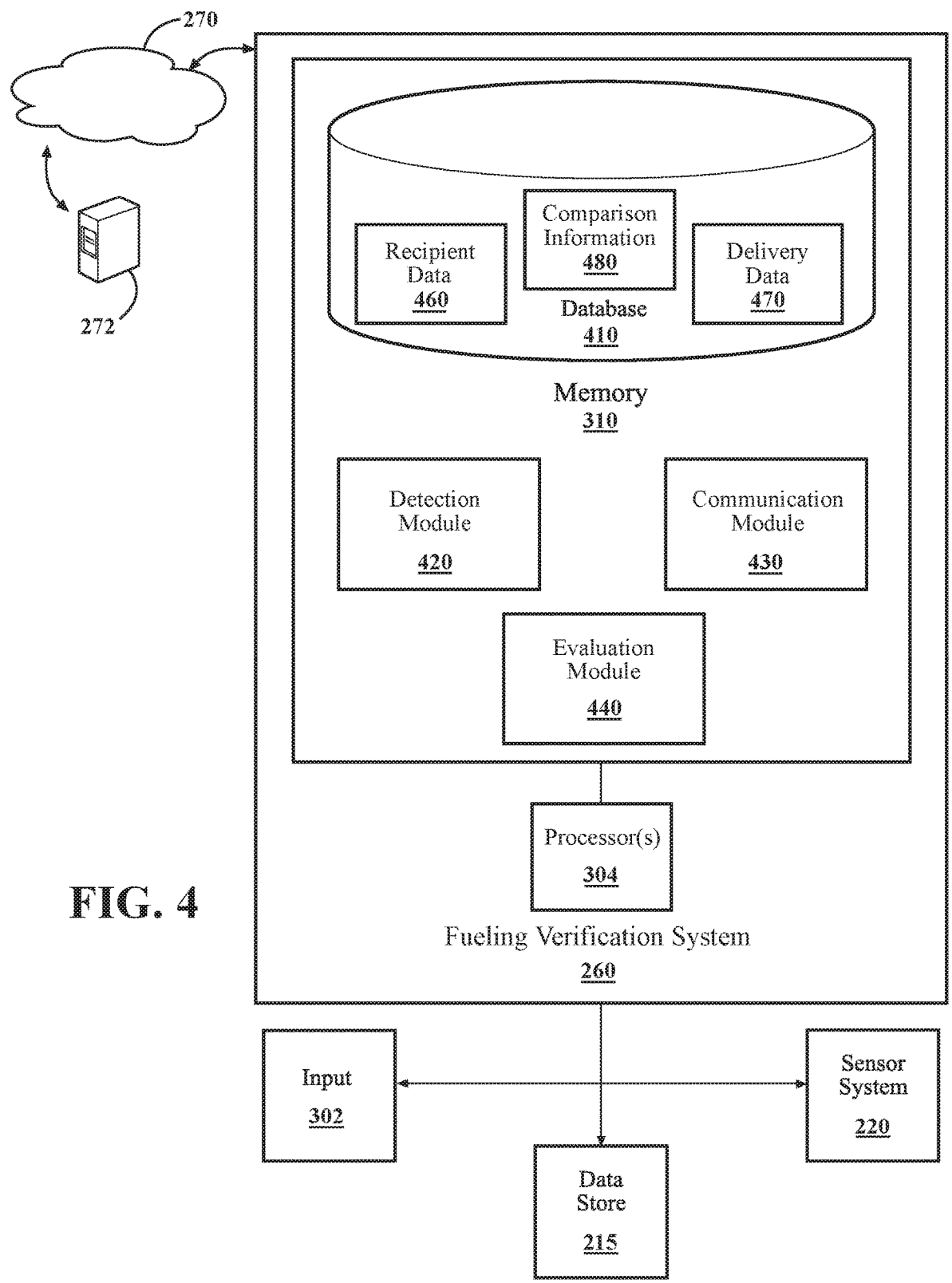
FIG. 4 is a fueling verification system for reputation-based device communication, according to one or more implementations.

FIG. 4 depicts a block diagram of the fueling verification system 260, according to some implementations. The fueling verification system 260 generally includes a plurality of modules. The modules can include instructions to collect information during the fueling process, to coordinate the data transmission between the one or more detection sources, and to determine fueling offset, if any, between the sources. The fueling verification system 260 is operatively connected with a processor, such as a processor 304 from the computing device 300 depicted in FIG. 3. In some implementations, the processor 304 can be a part of the fueling verification system 260, the fueling verification system 260 can include a separate processor from the processor 304 of the computing device 300, the processor 210 of the vehicle 200, or the fueling verification system 260 can access the processor 304 or the processor 210 through a data bus or another communication path.

In one or more implementations, the fueling verification system 260 can include the memory 310. The memory 310 can store one or more modules for use as part of the fueling verification system 260, such as the detection module 420, the communication module 430, and the evaluation module 440. The memory 310 can be any suitable form of memory, including a Random Access Memory (RAM), Read-Only Memory (ROM), a hard disk drive, a flash memory, or other suitable memory for storing the detection module 420, communication module 430, and evaluation module 440. The detection module 420, communication module 430, and evaluation module 440 are, for example, computer-readable instructions that when executed by the processor 304, cause the processor 304 to perform the various functions disclosed herein.

The memory 310 can further include a database, such as a database 410. The database 410 can include data or information for use as part of the implementation of the fueling verification system 260 described herein. The database 410 can include data or information collected, formulated, processed, derived, or manipulated from a variety of sources. In one or more implementations, the fueling verification system 260 can include the recipient data 460, the delivery data 470, and the comparison information 480. In some implementations, the database 410 or portions thereof can be a blockchain. The data and information can be incorporated into one or more blocks, each of said blocks receiving the verification code, described with reference to FIG. 1. The blocks can be integrated into the blockchain in a desired order, such as based on the order of creation, including branches or other formations as desired.

The detection module 420 can generally include instructions that function to control the processor 304 to collect a first fuel measure for a fueling process from a delivery source. In one or more implementations, the delivery source can be a location, device, or system for fueling another system or device. Examples of the delivery source, as used herein, can include a fueling station, such as a hydrogen fueling station. The detection module 420 can begin by receiving one or more inputs which indicate the fueling process has begun. The detection module 420 detects, determines, or is otherwise informed that the fueling process has begun, such as through the use of a flow sensor or by receiving a signal or data packet. In one or more implementations, the detection module 420 receives the one or more inputs from the delivery source. The detection module 420 can receive or collect the inputs upon connecting with the device for a fueling process. The detection module 420 can collect or otherwise be provided with the one or more inputs in response to a variety of steps in the fueling process. In some implementations, the steps can include fuel flowing from the delivery source to a recipient source (e.g., a vehicle), a fuel line connecting between the delivery source and the recipient source, or others.

The detection module 420 can include instructions to detect or collect a first fuel measure. The detection module 420 can begin with the detection or collection of the first fuel measure at a specific point in time, such as at the beginning the fuel flow. In further implementations, the detection module 420 can begin with the detection or collection of the first fuel measure based on the specific input, such as receipt of payment or connection of a fuel nozzle to a recipient source. The first fuel measure generally includes a determination of the various parameters of the flow of fuel, as delivered from the delivery source to the recipient source. The delivery source can detect a first fuel measure as part of the delivery of fuel from the delivery source to the recipient source.

The delivery source can include one or more sensors which tend to inform about the quality or delivery of fuel from the delivery source to the recipient source, such as flow rate sensors, temperature sensors, chemical sensors, or other sensors. The first fuel measure generally includes measurements of fuel delivery as detected through the sensors of the delivery source. Measurements of fuel delivery can include the rate of flow for the fuel, the total amount of fuel delivered from the delivery source to the recipient source, type or quality of fuel, pressure between the systems (e.g., such as a loss of pressure which might indicate loss of fuel), blockage, temperature, and others. In one or more implementations, the first fuel measure includes one or more measurements of delivery of fuel from the delivery source to the recipient source.

Further, the detection module 420 can collect the first fuel measure in real-time, such that the first fuel measure is available to the fueling verification system 260 for comparison as part of a continuous process. In further implementations, the detection module 420 can collect the first fuel measure as a periodic measure over a period of time, such as measurements in real-time or measurements at specific periodic intervals. In yet further implementations, the first fuel measure can be a combination of periodic measurements including both total amount and rate of change in various parameters.

The detection module 420 can further include instructions to record the first fuel measure in a recipient block for a blockchain. To store the first fuel measure, the detection module 420 can include instructions to modify the delivery data 470. The detection module 420 can integrate the delivery data 470 into a recipient block. The recipient block is a block for a blockchain containing data as detected from the recipient source. The recipient source can further include a verification code (e.g., a hash) related to the recipient block and one or more previous blocks in the blockchain. The recipient block and the verification code are configured such that the recipient block can be shared across the network while maintaining the integrity of the associated blockchain.

The detection module 420 can incorporate discrete portions of information in the recipient block, such as the first fuel measure or portions thereof. In one or more examples, the discrete portions of information in the recipient block can be related to the device identification, the one or more fuel measures, the one or more devices or systems interacting in the transmission, historical activity of the sources, or other fueling-related information. The detection module 420 can create a verification code, such as a hash, for each verification block added to the blockchain. As the verification code incorporates data from at least one previous block, any future modification of the block will show evidence of tampering (the verification code will not reflect the data in the new block). As such, the detection module 420 produces a verification code which restricts future modification of information in the blockchain.

The detection module 420 can further include instructions to store the first fuel measure as one or more components or elements in the delivery data 470. In one example, the detection module 420 can include instructions to store all information from the first fuel measure as well as related information to the delivery source as part of the delivery data 470. In one or more implementations, the detection module 420 can include instructions to distribute information from the first fuel measure between one or more standard databases in one or more blockchains. In another example, the detection module 420 can store the vehicle identification or various parameters about the vehicle in the standard database and fuel measurements over time can be stored as part of the blockchain. The delivery data 470, including the recipient block, can then be stored in memory, such as in the database 410 of the memory 310, and/or distributed to one or more devices throughout the network for later use.

The communication module 430 can generally include instructions that function to control the processor 304 to detect or collect a second fuel measure. The second fuel measure generally includes a determination of the various parameters of the flow of fuel, as delivered received and detected at the recipient source. The communication module 430 can detect or collect the second fuel measure in a substantially similar to that of the detection module 420 with regards to the first fuel measure. In some implementations, the communication module 430 can receive the second fuel measure from the recipient source, with or without prompting by the communication module 430. In further implementations, the communication module 430 can collect the second fuel measure through one or more sensors available to the recipient source, such as though a sensor system 220 in the vehicle 200. In one or more implementations where the recipient source is a vehicle, the second fuel measure can be a measure of various parameters of the fuel, as received by the vehicle. The parameters of the fuel for the second fuel measure can include fuel flow rates, the temperature at one or more points along the line of transmission to a fuel tank, fill status, or other parameters of the fuel measure as described herein.

The second fuel measure can further be controlled by instructions from the communication module 430 and/or received as information from one or more devices or systems capable of providing the fuel measure data described herein. In one or more implementations, the communication module 430, located remotely from the recipient source, can provide instructions to the recipient source and control sensors of the recipient source to collect the second fuel measure as described herein. In one or more further implementations, the communication module 430 is integrated into the recipient source and controls the collection of the fuel measure data as part of the recipient source. One skilled in the art will understand the breadth of possible combinations without further explicit recitation herein. The communication module 430 can further incorporate one or more sensors related to the detections or determinations described herein. The sensors used by the communication module 430 for the second fuel measure can be substantially similar to the sensors used for the first fuel measure.

The communication module 430 can store the second fuel measure as part of a recipient block, such as in the blockchain. The communication module 430 can create and verify the recipient block in a substantially similar manner to the delivery block, described above in relation to instructions from the detection module 420. The communication module 430 can incorporate the second fuel measure as part of the recipient block. The communication module 430 can further include instructions to collect the second fuel measure in real-time, such as during the fueling process as detected from the recipient source. The communication module 430 can include instructions to receive the second fuel measure or the recipient block through a network, such as from the recipient source to a delivery source, from the recipient source to a server, or others.

The communication module 430 can receive the second fuel measure or the recipient block in a variety of fashions. In some implementations, the communication module 430 can receive the second fuel measure or the recipient block in a continuously updated fashion, such as at specified intervals during the refueling process. In this implementation, recipient blocks can be sent with the verification code, such that the recipient blocks can be verified and added securely to the respective portions of the blockchain by the communication module 430. In further implementations, the second fueling measure can be sent as data to be integrated into the recipient blocks for integration into the blockchain by the communication module 430 upon receipt. Once received, the second fuel measure and the verified recipient blocks can be stored as part of the recipient data 460 in the database 410.

The evaluation module 440 can generally include instructions that function to control the processor 304 to compare the first fuel measure and the second fuel measure to determine a fueling offset. The evaluation module 440 can include instructions to compare and cross-reference one or more elements of the first fuel measure as stored in the delivery block to the second fuel measure as stored in the recipient block. Elements compared by the evaluation module 440 can include fuel amount, fuel flow rates, temperatures, and other parameters as recorded by the first fuel measure and the second fuel measure. In this way, the evaluation module 440 can determine differences between the fueling event as detected at the recipient source compared to the fueling event as detected by the delivery source, such as the amount of fuel expected to be delivered to the recipient source (e.g., the vehicle) from the delivery source (e.g., the fueling station). In one or more implementations, each delivery block can be compared individually to a respective block of the recipient blocks. In some examples, each delivery block and each recipient block are intended to represent a specific instance in time and related measurements from the delivery source and the recipient source, respectively. The evaluation module 440 can determine quantities at each of those given times, as well as rates of change and other statistical parameters. Each of the delivery blocks, which include the first fuel measure, and the recipient blacks, which include the second fuel measure, contain time marked information on the fueling process as detected by one or more sensors available to the delivery source and the recipient source, respectively. Thus, the evaluation module 440 can determine where the differences occur in each of the measures, what the differences are, points of failure, and other information. In one or more further implementations, the evaluation module 440 can grossly compare the first fuel measure to the second fuel measure, such as to determine if the fuel quantity received is equal to the fuel quantity sent. The comparison between the first fuel measure and the second fuel measure can be stored as part of the comparison information 480, such as in the database 410.

The evaluation module 440 can then apply the comparison to determine the fueling offset. The comparison can be used to determine the difference between the fueling requested, and the fueling received. In some cases, this can create a financial difference between the delivery source and the receiving source (e.g., the receiving source paid for more fuel than they received). As such, to balance the transfer between the delivery sources and the recipient source, the evaluation module 440 can create and present a fueling offset. The fueling offset can be one or more measurements and one or more adjustments to equalize the fuel distribution and compensation between the delivery source and the recipient source. In one or more implementations, the fueling offset can include an amount of fuel and an amount of money, which can be transferred to or from the delivery source or the recipient source. In some implementations, the evaluation module 440 can produce a variety of fueling offsets. Thus, evaluation module 440 can allow the delivery source and the recipient source to choose the desired fueling offset. Thus, the fueling offset can be used to equalize the transaction between the delivery source and the recipient source.

Further, the evaluation module 440 can incorporate related information regarding the difference in the fueling offset. In some instances, the fueling offset may indicate that a delivery source or a recipient source is in need of repair (e.g., localized depressurization and cooling indicating a hydrogen leak). Thus, the evaluation module 440 can present this information to the respective source, such that further loss or other harms can be avoided. Examples of information that can be incorporated into the fueling offset can include, but are not limited to, a fuel transfer above or below the amount expected by the delivery source, a payment above or below the amount expected by the recipient source, an indication of desirability for calibration or repair for the delivery source and/or the recipient source, or others.

In one or more further implementations, the evaluation module 440 can include instructions to inform the delivery source and or the recipient source of modifications or repairs. In one example, the evaluation module 440 can include instructions to apply the first fuel measure, the second fuel measure, and/or the fueling offset to modify a measuring system. The measuring system, as described herein, includes one or more sensors and/or instructions or calibrations for said sensors. In further implementations, the evaluation module 440 can determine that the fueling offset is beyond a critical value. Critical value, as used herein, refers to a level of difference which indicates a possible safety issue. It is understood that various fuels, such as gasoline or hydrogen are extremely flammable and explosive. As such, a leak of these fuels could create a dangerous situation for the recipient source and the delivery source. Thus, the evaluation module 440 can have one or more critical values for the fueling offset which indicate a leak or other hazardous situation. The evaluation module 440 can include instructions to control the fueling process in the case of exceeding the critical value, such as by shutting down the fueling process.

The evaluation module 440 can further include instructions act as an intermediary for the fueling offset compensation. In some implementations, the evaluation module 440 can assist in or regulate the actions taken to compensate between the delivery source and the recipient source. In some implementations, the evaluation module 440 can include instructions to compensate at the point-of-sale. The compensation, as described above, can include any form of acceptable compensation including, but not limited to, fuel (e.g., hydrogen fuel), currency, goods, virtual currency, discounts, or others. Further, the evaluation module 440 can deliver the compensation in any acceptable fashion between the delivery source and/or the recipient source (or related controlling parties, such as a driver or operator).

The compensation can be provided directly, such as through direct payment, or indirectly, such as through a bank transfer. In some implementations, the compensation can be provided electronically, such as through wired or wireless connection. The evaluation module 440 can provide the compensation automatically, such as by the evaluation module 440 communicating instructions to the delivery source to provide further fuel and/or reduce the charge for the fuel. In further implementations, the evaluation module 440 can transmit one or more indications to the recipient source, such as to allow a driver or an operator to select from one or more options for compensation. Other methods of the transaction between the sources are contemplated in combinations of the implementations described herein, without further explicit recitation.

In one or more implementations, the communication module 430 can further include instructions to create a status ledger. The status ledger, as used herein, refers to a database for recording the status of one or more delivery sources (e.g., fueling stations) with relation to their overall and/or individual fueling capacity. The status ledger can be included as part of the blockchain, in a separate blockchain (e.g., a blockchain status ledger), or others. The status ledger can be used to determine the availability of the one or more delivery sources to provide for the fueling desires of one or more recipient sources (e.g., vehicles). Thus, the status ledger can allow the one or more detection sources to determine where and whether to refuel at the one or more delivery sources.

In further implementations, the communication module 430 can further include instructions to record one or more fueling queue requests. The communication module 430 can receive a request for refueling from the one or more recipient sources. With consideration of refueling capacity of the one or more delivery sources, such as from the blockchain status ledger, the communication module 430 can create a queue of the requests received from the one or more recipient sources and/or redirect the one or more recipient sources to one or more delivery sources dependent on location, capacity, and other factors. The communication module 430 can further include instructions to receive or send payment related to the fueling process.

For simplicity, the delivery source is generally described with reference to systems or devices which provide fuel and the recipient source is generally described with reference to systems or devices which receive fuel. However, the fueling verification system 260 is not intended to be limited by the storage location of the fueling verification system 260 with respect to fuel flow. It is understood that the delivery source and/or the recipient source can be a system or device which provides fuel, a system or device which receives fuel, or combinations thereof. Further, it is understood that if the delivery source is for fueling another system or device, the recipient source is receiving fueling, or vice versa. In further implementations, the delivery source can be a device or system receiving fuel, such as a vehicle. In yet further implementations, the fueling verification system 260 can be stored remotely from the delivery source and the recipient source, such that the elements described herein for the fueling verification system 260 are performed without respect to directionality (e.g., from the delivery source to the recipient source). In one or more implementations, the fueling verification system 260 can include instructions to receive sensor data or information from the detection sources sequentially, concurrently, or otherwise, and compare the related quantities without consideration of delivery order.

Figure 5:
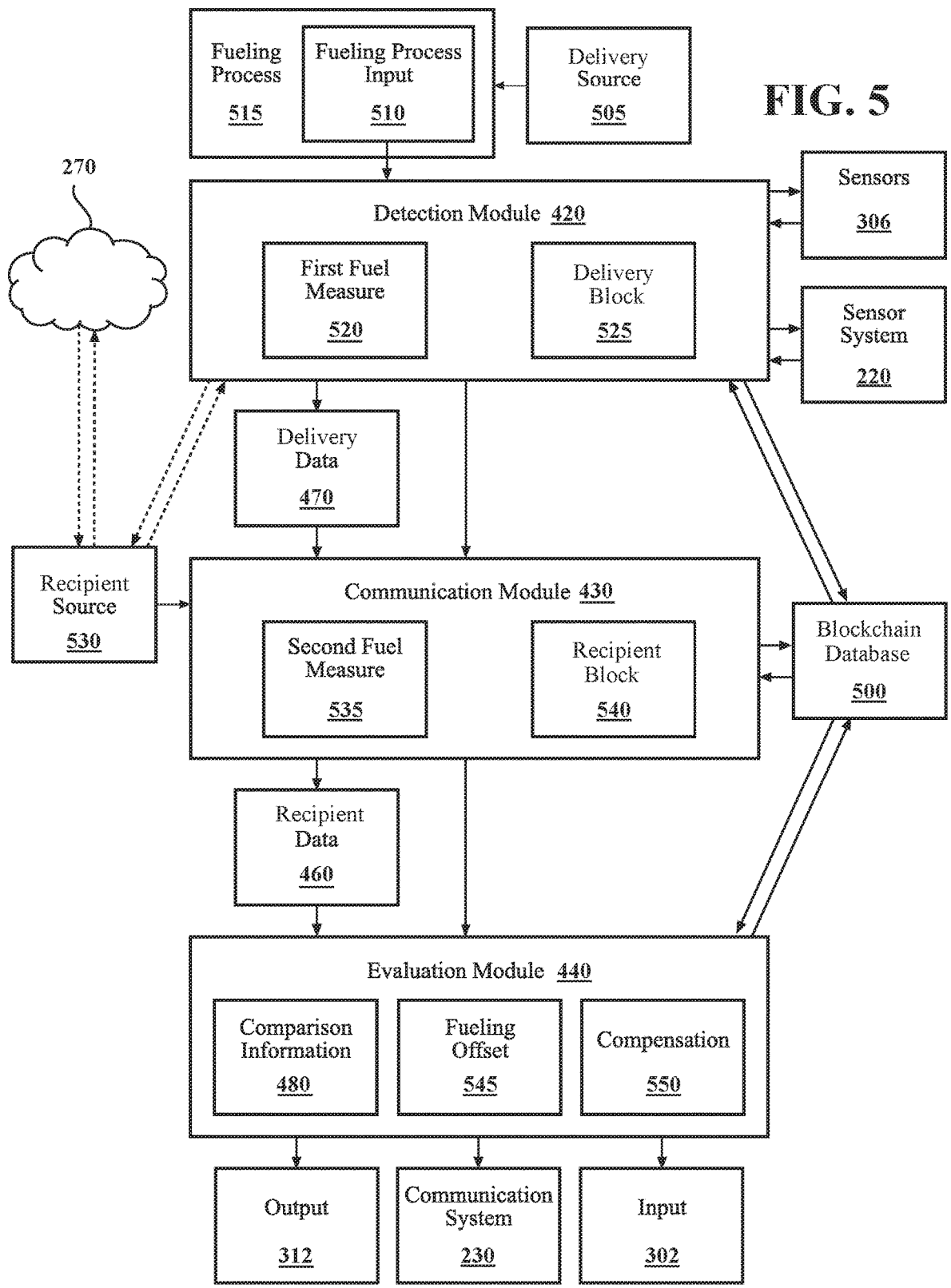
FIG. 5 is a schematic of the fueling verification system, according to one or more implementations.

FIG. 5 is a schematic of the fueling verification system 260, according to one or more implementations. The fueling verification system 260 can be configured to receive information from a delivery source, such as a fueling station, regarding the first fuel measure during the fueling process. The first fuel measure can be compared against a second fuel measure to determine if the first fuel measure is accurate with regards to the amount of fuel transferred. This secondary comparison for measurement can be beneficial during fueling processes, such as a hydrogen fueling process.

In operation, the fueling verification system 260 can begin with a delivery source 505 beginning a fueling process 510, such as the delivery of hydrogen fuel to the vehicle. The delivery source 505 can further provide a fueling process input 515. The fueling process input 515 can include one or more transmissions of data or information which indicate to the fueling verification system 260 that the delivery source 505 is at some stage of the fueling process. The fueling process input 515 and/or other indicia of the beginning of the fueling process can initiate the detection module 420.

The fueling verification system 260 can include the detection module 420. The detection module 420 can include instructions to interact with the sensors 306 and/or the sensor system 220 to collect a first fuel measure 520. The first fuel measure 520 can be a measurement of the dispensing of fuel at the delivery source 505. The first fuel measure 520 can include data as collected from one or more of the sensors 306, the sensor system 220, or others which can provide information on the measurement of fuel as dispensed at the delivery source 505. The first fuel measure 520 can then be incorporated into the delivery block 525. The delivery block 525 can be a block including the fuel measure data which the fueling verification system 260 can incorporate into a blockchain 500.

The delivery block 525 incorporates the fuel measurement related information as collected by the detection module 420 or received from the delivery source 505. The delivery block 525 can be distributed to members of the network and stored in the blockchain 500, as previously described. The detection module 420 can further include instructions to incorporate the first fuel measure 520, the delivery block 525, or both into the delivery data 470. Though shown separately, the fueling verification system 260 can incorporate the delivery data 470 into the blockchain 500. The detection module 420 can then transmit or otherwise make available the fueling process input 515, the first fuel measure 520, and/or the delivery block 525, to the communication module 430.

The communication module 430 can include instructions to receive the information or data as derived from the delivery source 505. The communication module 430 can further include instructions to receive data from a recipient source 530. In one or more implementations, the recipient source 530 is the vehicle or device in communication with the delivery source 505 as part of the refueling process. In one or more examples, the recipient source 530 is a vehicle receiving fuel from the delivery source 505. Optionally, the detection module 420 can include instructions to interact with or control the recipient source 530 to collect a second fuel measure 535. In further optional implementations, the recipient source 530 can provide the second fuel measure 535 to the communication module 430 without interaction from the detection module 420, such as from the recipient source 530 itself or as delivered from a remote source through the network 270.

The second fuel measure 535 can then be incorporated by the communication module 430 into a recipient block 540. The recipient block 540 can be a block for a blockchain which receives the collected fuel measurements from the recipient source. The communication module 430 can use the recipient block 540 along with a generated verification code to secure and distribute the information received from or related to the recipient source 530, such as identification information, the second fuel measure 535, queue information, or others. The recipient block 540 can be distributed to members of the network and stored in the blockchain 500, as previously described. The communication module 430 can further include instructions to incorporate the second fuel measure 535 and/or the recipient block 540 into the recipient data 460. The communication module 430 can then forward the second fuel measure 535, the recipient block 540, and/or the recipient data 460 to the evaluation module 440 for further processing.

Upon receiving at least the first fuel measure 520 and the second fuel measure 535, the evaluation module, 440 can then compare and evaluate for differences between the first fuel measure 520 and the second fuel measure 535. These differences and other information can be incorporated into the comparison information 480 to determine a fueling offset 545. The fueling offset 545 can include information and/or data regarding balancing the transaction between the delivery source 505 and the recipient source 530. The evaluation module 440 can then further include instructions to provide a compensation 550, to the recipient source 530 and/or the delivery source 505 based on the fueling offset 545. The compensation 550 can include fuel, currency, goods, or others such that the amount of fuel received can be accommodated for in respect to the amount of fuel purchased or requested. The evaluation module 440 can further include instructions to communicate with an occupant or another system using one or more communication devices, such as the output 312, the communication system 230, and/or the input 302. In some implementations, the evaluation module 440 provides an output through the communications system 230 to one or more display device(s) 233.

In further implementations, the evaluation module 440 can include instructions to create a queue for one or more vehicles, to determine wait times for one or more fueling stations, to autonomously instruct vehicles based on said queues or wait times or others. Thus, the fueling verification system 260 provides a mechanism of corroborating a fueling process between the delivery source and a recipient source. Through the use of blockchain technology, the data can be transmitted reliably and be maintained resistant to manipulation. The fueling verification system 260 provides multiple benefits, including reduction of loss to the machine failure and assuring proper maintenance. Further, the fueling verification system 260 allows a new route of determination of faults and failures in the fueling process. Finally, the fueling verification system 260 increases the reliability of the fueling process, such as when dealing with the possibility of freezing components during a hydrogen fueling process.

Figure 6:
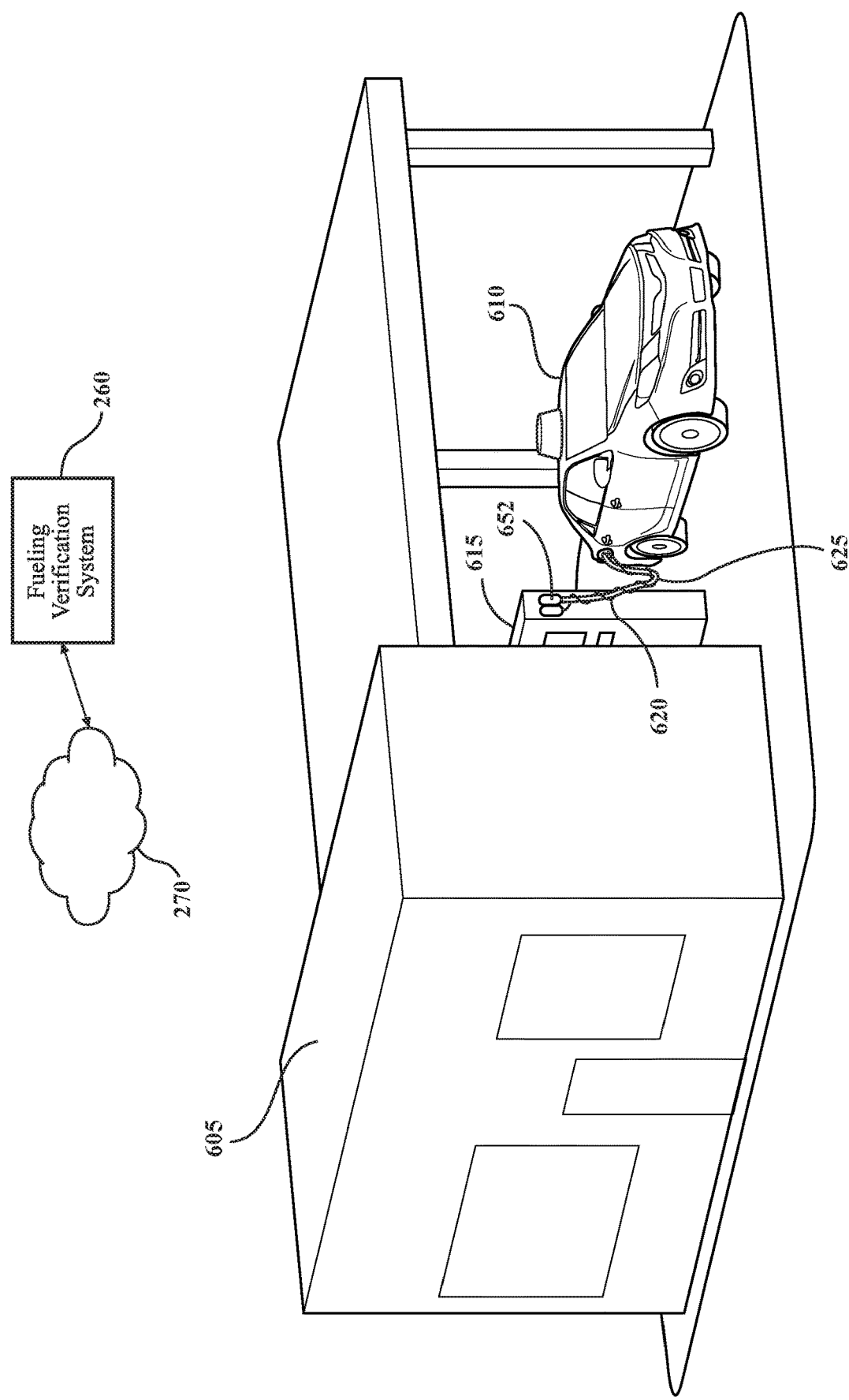
FIG. 6 are depictions of an exemplary fueling transaction incorporating the fueling verification system, according to one or more implementations.

FIG. 6 is a depiction of an interaction between a delivery source and recipient source incorporating the fueling verification system, according to one or more implementations. The delivery source (a fueling station 605) and the recipient source (a vehicle 610) are shown as part of an environment 600. The vehicle 610 can be substantially similar to the vehicle 200, described with reference to FIG. 2. The fueling verification system 260 can be stored in a variety of ways as described above, such as part of the vehicle 610, the server 272, the computing device 300, or others. Shown here, the fueling verification system 260 can be stored on the server 272 and accessible via the network 270. However, this is not intended to be limiting of possible locations for the fueling verification system 260, components thereof or modules thereof. In further implementations, the fueling verification system 260 can be stored locally, such as in part or entirely in the fueling station 605, in the vehicle 610, or combinations thereof.

The fueling station 605 is depicted here as being in communication with fueling verification system 260 and with the vehicle 610 through the network 270. The vehicle 610 can move into the fueling station 605 before, during or after the fueling detection is transmitted (e.g., the fueling process input). In one implementation, the fueling process input is transmitted from the vehicle 610 after being connected with the receptacle 615 of the fueling station 605. The receptacle 615 can include a connection 620 and a fueling line 625. The receptacle 615 can be configured to deliver a variety of fuel, such as gasoline, diesel, hydrogen, or others as can be used for powering a vehicle or other mechanical device. The connection 620 can be an information port which connects to the vehicle 610 to create a secondary network connection between the network 270 and the vehicle 610. In some implementations, the connection 620 can allow for faster transmission of information and data than the one or more preexisting connections with the vehicle 610. The connection 620, though shown here as a wired connection, can be a wired or wireless connection.

The fueling line 625 can be a refueling connection or recharging connection for the vehicle 610. In one or more implementations, the fueling line 625 can be a line configured for fueling a hydrogen fuel cell. The fueling line 625 can further include one or more sensors 622. The one or more sensors 622 can be configured to collect information or data regarding the fuel as delivered to the vehicle 610. Examples of the one or more sensors 622 can include flow rate sensors, temperature sensors, pressure sensors, or others as indicated for the type of fuel being delivered.

In operation, the detection module 420 can receive a fueling process input from the fueling station 605. The detection module 420 can then collect information and data from the fueling station 605 during the refueling process. The information can include the first fuel measure 520, which can be collected by the detection module 420 using the one or more sensors 622. The detection module 420 can then store the first fuel measure 520 as part of the delivery data 470, such as storing the first fuel measure 520 as part of the delivery block 525. The detection module 420 can further store the delivery block 525 as part of a blockchain, described with reference to FIG. 1 and FIG. 4.

As shown here, the fueling verification system 260 can use instructions from the detection module 420 to receive information from the fueling station 605 about the refueling process with the vehicle 610. In this example, the first fuel measure 520 can be given a value of 25 (in arbitrary units) and a delivery rate of one (1) unit per increment of time. In one or more implementations, the delivery rate can be determined by a comparison between each block of the delivery block 525 indicating how much fuel was detected by the detection module 420 as being delivered to the vehicle 610 by the fueling station 605. The delivery rate can be a changing measure, such as by the detection module 420 updating the delivery rate using the fuel measure data collected at each increment of time during the fueling process.

The fueling verification system 260 can then access the second fuel measure 535, as collected by or through the vehicle 610. The fueling verification system 260 can store the second fuel measure 535 as part of the recipient data 460, such as part of the recipient block 540 as stored in the recipient data 460 and/or the blockchain 500. In some implementations, the vehicle 610 can collect the second fuel measure 535 based on instructions from the fueling verification system 260. Here, the fueling verification system 260 or components thereof can be stored locally, such as in the vehicle 610, stored remotely, such as in the fueling station 605 or in one or more of the computing device 300, or combinations thereof. In this example, the vehicle 610, through the fueling verification system 260, collects the second fuel measure 535, such as a second fuel measure having a given a value of 24.7 (in arbitrary units) and an average delivery rate of 0.98 units per increment of time.

The second fuel measure 535 can then be forwarded to or otherwise be available to the fueling verification system 260. In some implementations, the second fuel measure 535 can be forwarded or presented to the fueling verification system 260 as an independent information source, as part of the recipient data 460, as part of the recipient block 540, or combinations thereof.

The fueling verification system 260 can then, through the evaluation module 440, compare the first fuel measure 520 with the second fuel measure 535 as part of the comparison information 480. The fueling verification system 260 then references the blockchain 500 to collect the first fuel measures and the second fuel measures as related to their positions in the blockchain and various metadata, such as timestamps. In one or more implementations, the fueling verification system 260 can compare the first fuel measure 520 and the second fuel measure 535 at respective time points to determine points where changes in delivery rate or blockages may have occurred. In one or more further implementations, the fueling verification system 260 can exchange the blocks containing the first fuel measure 520 and the second fuel measure 535 between the fueling verification system 260, the fueling station 605, and the vehicle 610 in real-time. The fueling verification system 260 can apply the real-time exchange to determine changes in delivery rate, blockages, or other faults can be determined in real-time. In this example, the comparison information 480 can show that a partial blockage occurred three (3) increments in time into the fueling process.

Further, the comparison information 480 can show that this blockage was detected by the fueling station 605 and not by the vehicle 610. The comparison information 480 can further show partial fractions of fuel transferred within each increment. The comparison information 480 can further include sensor information derived from the sensor system 220 and/or the one or more sensors 622, which can be applied by the fueling verification system 260 to determine possible causes for variations. Here, the fueling verification system 260 can determine that increases in pressure detected by the sensor system 220 at the fueling station 605 indicate a possible freeze in the line during the fueling process.

The fueling verification system 260 can then use the comparison information 480 to create the fueling offset 545 between the fueling station 605 and the vehicle 610. The fueling offset 545 can include the amount of the difference in fueling measures, the likely cause of the difference, and possible compensations available. The fueling verification system 260 can then forward the fuel offset and possible compensation options to the vehicle 610. In this example, the fueling offset 545 can include a reduction in price to accommodate for the difference in fuel delivered to the vehicle 610 (e.g., the difference between 25 units and 24.7 units) or request to transfer the difference in total fuel delivered. The fueling verification system 260, through the evaluation module 440, can communicate with the vehicle 610 and the operator of the vehicle 610, through one or more communication devices, such as the communication system 230, described with reference to FIG. 2.

Further, the fueling verification system 260 can use the sensor data as provided by the sensor system 220 and/or the one or more sensors 622 to determine if there any faults in the fueling station 605. In one example, the sensor data may indicate that the blockage detected by sensor system 220 was due to an issue in one or more components of the receptacle 615. The fueling verification system 260 can then communicate with the fueling station 605 regarding the issue in the receptacle 615, such that the fueling station 605 can be repaired. In further implementations, the fueling verification system 260 can communicate a possible fueling delay, such as to vehicles in a queue. The communication can allow one or more vehicles in the area to take alternative actions, such as be rerouted from the fueling station 605, queued for another time, or others as desired by the one or more vehicles.

Thus, the fueling verification system 260 can assist both the fueling station 605 and the vehicle 610 in the fueling process. The fueling verification system 260 can coordinate fuel measurements, such as the first fuel measure 520 and the second fuel measure 535, to assure that fuel is being transferred properly between the fueling station 605 and the vehicle 610. The fueling verification system 260 can further assist in rectifying or correcting issues that occur in the fueling process, such as adjusting for the difference in price or value of the actual amount of fuel transferred between the fueling station 605 and the vehicle 610.

Figure 7:
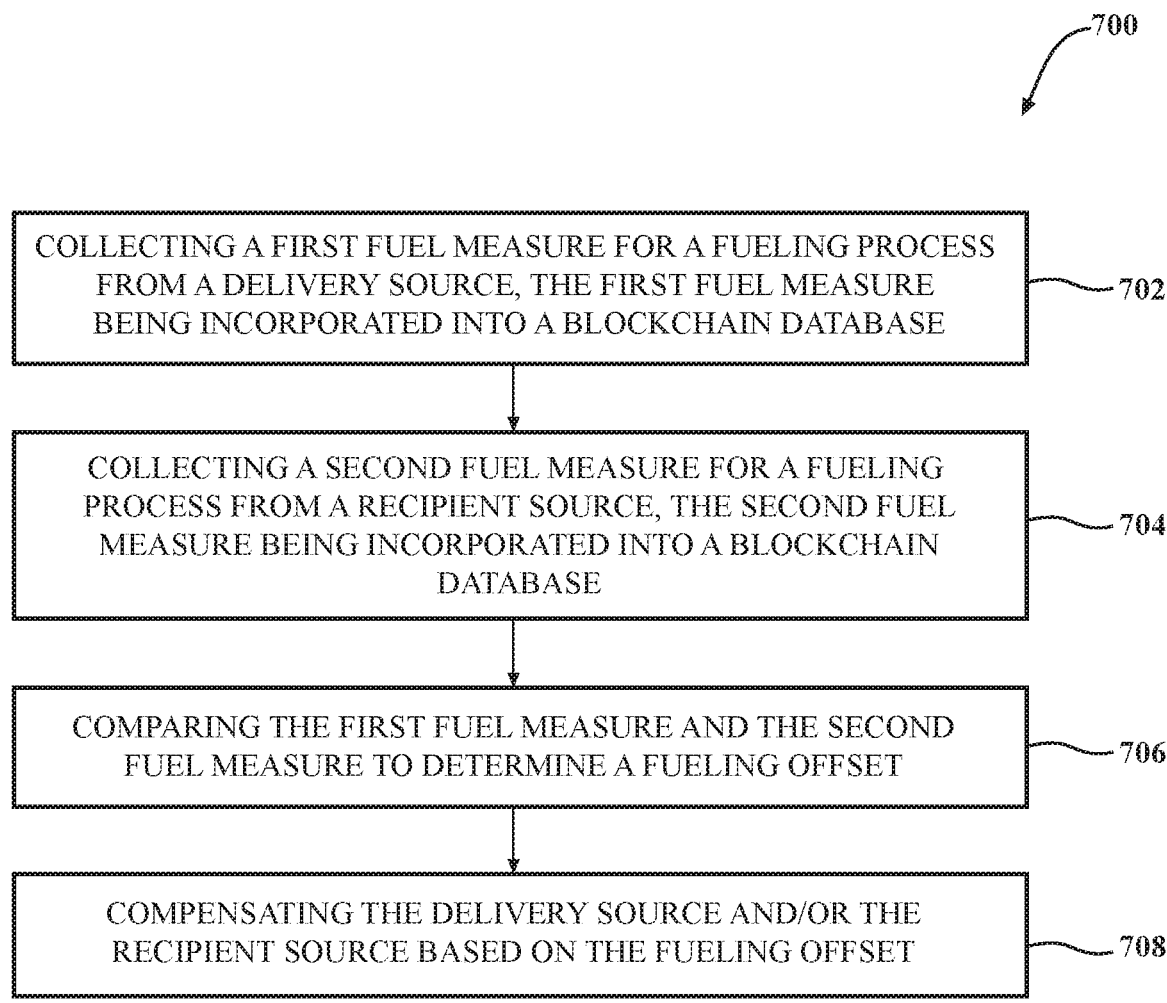
FIG. 7 is a flow diagram of a method for vehicle fueling including status verification, according to one or more implementations.

FIG. 7 is a flow diagram of a method 700 for corroboration of vehicle fueling, according to one or more implementations. The method 700 can provide a robust, non-centralized, and immutable transmission of sensor data regarding fueling between the delivery source and a recipient source. Thus, the method 700 provides a variety of benefits for detection of an error, determination of discrepancies, and maintenance of accurate and precise records. The method 700 can include collecting a first fuel measure for a fueling process from a delivery source, at 702. A second fuel measure for a fueling process can then be collected from a recipient source, at 704. The first fuel measure and the second fuel measure can then be compared to determine a fueling offset, at 706. The delivery source and/or the recipient source can then be compensated based on the fueling offset, at 708.

The method 700 can begin with collecting a first fuel measure for a fueling process from a delivery source, at 702. The method 700 can include detecting a first fuel measure during a fueling process, such as from a delivery source. In one or more implementations, the delivery source can be substantially similar to the detection source, described with reference to FIG. 4. Examples of the delivery source, as used herein, can include a fueling station, such as a hydrogen fuel cell fueling station. The method 700 can begin by receiving one or more inputs which indicate the fueling process has begun. In one or more implementations, the one or more inputs can be received from the delivery source upon connecting with the device for a fueling process. The one or more inputs can be provided in response to a variety of steps in relation to the fueling process, such as fuel flowing from the delivery source to a recipient source (e.g., a vehicle), a fuel line connecting between the delivery source and the recipient source, or others.

The method 700 can include determining various parameters for the first fuel measure between the delivery source and the recipient source, such as detecting first fuel measure as part of the delivery of fuel from the fueling station to the vehicle. The delivery source can include one or more sensors, substantially similar to those described above with reference to FIG. 4. The first fuel measure can include the rate of flow, the total amount of fuel delivered between the delivery source in the recipient source, type or quality of fuel, pressure between the systems (e.g., such as a loss of pressure which might indicate loss of fuel), blockage, temperature, and others. The first fuel measure can include one or more measurements of delivery of fuel from the delivery source to the recipient source and/or periodic measurement over a period of time. The first fuel measure can include measurements in real-time or measurements at specific periodic intervals. In yet further implementations, the first fuel measure can be a combination of periodic measurements including both total amount and rate of change in various parameters.

The method 700 further includes recording the first fuel measure as part of a delivery block. The delivery block can be substantially similar to the delivery block described with reference to FIGS. 4 and 5. The delivery block can include a verification code, such as a hash. The method 700 can create the verification code using data in the delivery block and data in one or more previous blocks of the blockchain. The method 700 further includes communicating or forwarding the delivery block to other devices in the network, which can verify the block and incorporate it into the blockchain. As described above, the verification code makes the data incorporated into the code immutable, in the sense that any changes to said data will be detectable.

In one or more implementations, the detection and/or collection of a first fuel measure can be included as part of a system, such as the fueling verification system 260 described with reference to FIG. 4. The fueling verification system 260 can include the detection module 420. The detection module 420 can generally include instructions that function to control the processor 304 to detect a first fuel measure during a fueling process from a delivery source. In one or more implementations, the detection module 420 can begin by receiving one or more inputs that fueling has begun. The detection module 420 can then collect a first fuel measure and record the first fuel measure in the blocks of the blockchain. The first fuel measure can be stored as part of delivery data 470, shown as part of the database 410.

A second fuel measure for a fueling process can then be collected from a recipient source, at 704. The method 700 can collect or receive the second fuel measure in a substantially similar to the detection or collection of the second fuel measure, described above with reference to FIG. 4. In some implementations, the second fuel measure generally is a detection, using sensors available to the recipient source, of how the fuel is being received by the recipient source. The second fuel measure can include fuel flow rates, the temperature at one or more points along the line of transmission to a fuel tank, fill status, or other parameters of the fuel measure as described herein. The method 700 can then store the second fuel measure as part of the recipient block, such as in the blockchain. The method can incorporate the data, generate the verification code, transmit and verify the block, and incorporate the block in the blockchain in a substantially similar manner to the recipient block, described above with relation to FIG. 4. The method 700 can use one or more sensors for the second fuel measure, which can be substantially similar to the sensors used for the first fuel measure. The second fuel measure can further be controlled by the method 700 and/or received as information from one or more methods, devices, or systems capable of providing the fuel measure data described herein.

In one or more implementations, the detection and/or collection of a second fuel measure and recording of the second fuel measure as part of a blockchain can be included as part of a system, such as the fueling verification system 260 described with reference to FIG. 4. The fueling verification system 260 can include the communication module 430. The communication module 430 can generally include instructions that function to control the processor 304 to detect or collect a second fuel measure. The communication module 430 can further incorporate one or more sensors related to the detections or determinations described herein. The communication module 430 can further include instructions to record the second fueling measure as part of a recipient block, as described above with reference to FIG. 4.

The first fuel measure and the second fuel measure can then be correlated to determine a fueling offset, at 708. Due to the complications of transferring fuels, such as hydrogen, the first fuel measure and the second fuel measure can differ dramatically. As such, the method 700 can compare and cross-reference one or more elements of the delivery blocks and the recipient blocks to determine differences in the transfer of fuel. In this way, the method 700 can determine differences between the amount of fuel expected to be delivered to the recipient source (e.g., the vehicle) as compared to the amount believed to be delivered by the delivery source (e.g., the fueling station). In one or more implementations, the delivery blocks can be compared individually to recipient blocks in a sequential or time-related manner. Thus, the method 700 can determine quantities at each of those given times as well as rates of change to determine where the differences occur in each of the measures, what the differences are, points of failure, and other information. In further implementations, the method 700 can compare the first fuel measure/delivery blocks grossly to the second fuel measure/recipient blocks, such as to determine if the fuel quantity received is equal to the fuel quantity sent.

The method 700 can further include incorporating the differences between the first fuel measure and the second fuel measure into the fueling offset. The fueling offset can be one or more measurements and/or one or more adjustments to equalize the fuel distribution and compensation between the delivery source and the recipient source. The method 700 can further include details related to the fueling event in the fueling offset, such as repairs or metadata extrapolated from the fueling data. Examples of information that can be incorporated into the fueling offset can include, but are not limited to, a fuel transfer above or below the amount expected by the delivery source, a payment above or below the amount expected by the recipient source, an indication of desirability for calibration or repair for the delivery source and/or the recipient source, or others. In one or more further implementations, the method 700 can further include informing the delivery source and or the recipient source of modifications or repairs. In one example, the method 700 can further include applying the first fuel measure, the second fuel measure, and/or the fueling offset to modify a measuring system. The measuring system, as described herein, includes one or more sensors and/or instructions or calibrations for said sensors.

In one or more implementations, the correlation of the first and the second fuel measure and the determination of the fueling offset can be included as part of a system, such as the fueling verification system 260 described with reference to FIG. 4. The fueling verification system 260 can include the evaluation module 440. The evaluation module 440 can generally include instructions that function to control the processor 304 to correlate the first fuel measure and the second fuel measure, as stored in the blockchain, to determine a fueling offset. The evaluation module 440 can include instructions to compare and cross-reference one or more elements of the first fuel measure and the second fuel measure. The evaluation module 440 can further include instructions to incorporate the differences between the first fuel measure and the second fuel measure into the fueling offset. The comparison and the fueling offset can be stored as part of the comparison information 480 in the database 410.

The delivery source and/or the recipient source can then be compensated based on the fueling offset, at 710. In one or more implementations, the method 700 can include instructions to compensate at the point-of-sale. In one or more implementations, the method 700 can include providing a variety of details related to the compensation for the fueling offset, such as the amount of fuel and/or an amount of money, which can be transferred to or from the respective detection source, to equalize the transaction between the delivery source and the recipient source. The compensation, as described above, can include any form of acceptable compensation including, but not limited to, fuel (e.g., hydrogen fuel), currency, goods, virtual currency, discounts, or others. Further, the method 700 can deliver the compensation in any acceptable fashion between the delivery source and/or the recipient source (or related controlling parties, such as a driver or operator). The method 700 can provide the compensation directly, such as through direct payment. Further, method 700 can provide the compensation electronically, such as through wired or wireless connection.

In one or more implementations, the compensation for the fueling offset can be included as part of a system, such as the fueling verification system 260 described with reference to FIG. 4. The fueling verification system 260 can include the evaluation module 440. The evaluation module 440 can generally include instructions that function to control the processor 304 to compensate for the fueling offset. The evaluation module 440 can include instructions to present one or more mechanisms or types of compensation. The compensation can be presented through a communication system, such as the communication system 230. The compensation can be stored as part of the comparison information 480 in the database 410.

In one or more implementations, the method 700 can further include creating a status ledger. The status ledger can be incorporated into a blockchain, such as the blockchain. The status ledger, as used herein, refers to a database for recording the status of one or more delivery sources (e.g., fueling stations) with relation to their overall and/or individual fueling capacity. The method 700 can incorporate a variety of details into the status ledger, such as the availability of the one or more delivery sources to provide for the fueling desires of one or more recipient sources (e.g., vehicles) and possible alternatives. The method 700 can collect status information from a variety of delivery sources such that the status ledger provides a regional overview of refueling stations and statuses. Thus, the blockchain status ledger can allow the one or more detection sources to determine where and whether to refuel at the one or more delivery sources.

In further implementations, the method 700 can further include recording one or more fueling queue requests. The method 700 can receive a request for refueling from the one or more recipient sources. With consideration of refueling capacity of the one or more delivery sources, such as from the status ledger, the method 700 can create a queue of the requests received from the one or more recipient sources. The method 700 can further redirect the one or more recipient sources to one or more delivery sources dependent on location, capacity, and other factors. The method 700 can further include instructions to receive or send payment related to the fueling process. The payment can be related to any step of the process, including as a fee for entering the queue, the cost of the product or services, and/or compensation as described above.

FIG. 2 will now be discussed in full detail as an example vehicle environment within which the system and methods disclosed herein may operate. In some instances, the vehicle 200 is configured to switch selectively between an autonomous mode, one or more semi-autonomous operational modes, and/or a manual mode. Such switching, also referred to as handover when transitioning to a manual mode, can be implemented in a suitable manner, now known or later developed. "Manual mode" means that all of or a majority of the navigation and/or maneuvering of the vehicle is performed according to inputs received from a user (e.g., human driver/operator).

In one or more implementations, the vehicle 200 can be an autonomous vehicle. As used herein, "autonomous vehicle" refers to a vehicle that operates in an autonomous mode. "Autonomous mode" refers to navigating and/or maneuvering the vehicle 200 along a travel route using one or more computing devices to control the vehicle 200 with minimal or no input from a human driver/operator. In one implementation, the vehicle 200 is configured with one or more semi-autonomous operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the vehicle 200 along a travel route. Thus, in one or more implementations, the vehicle 200 operates autonomously according to a particular defined level of autonomy. For example, the vehicle 200 can operate according to the Society of Automotive Engineers (SAE) automated vehicle classifications 0-5.

The vehicle 200 can include one or more processors 210. In one or more arrangements, the processor(s) 210 can be a main processor of the vehicle 200. For instance, the processor(s) 210 can be an electronic control unit (ECU). The vehicle 200 can include one or more data stores 215 for storing one or more types of data. The data store 215 can include volatile and/or non-volatile memory. Examples of suitable data stores 215 include RAM, flash memory, ROM EPROM, EEPROM (Electrically Erasable Programmable Read-Only Memory), registers, magnetic disks, optical disks, hard drives, or any other suitable storage medium, or any combination thereof. The data store 215 can be a component of the processor(s) 210, or the data store 215 can be operably connected to the processor(s) 210 for use thereby. The term "operably connected," as used throughout this description, can include direct or indirect connections, including connections without direct physical contact.

In one or more arrangements, the one or more data stores 215 can include map data 216. The map data 216 can include maps of one or more geographic areas. In some instances, the map data 216 can include information or data on roads, traffic control devices, road markings, structures, features, and/or landmarks in the one or more geographic areas. In one or more arrangement, the map data 216 can include one or more terrain maps 217. The terrain map(s) 217 can include information about the ground, terrain, roads, surfaces, and/or other features of one or more geographic areas. In one or more arrangement, the map data 216 can include one or more static obstacle maps 218. The static obstacle map(s) 218 can include information about one or more static obstacles located within one or more geographic areas.

The one or more data stores 215 can include sensor data 219. In this context, "sensor data" means any information about the sensors that the vehicle 200 is equipped with, including the capabilities and other information about such sensors. As will be explained below, the vehicle 200 can include the sensor system 220. The sensor data 219 can relate to one or more sensors of the sensor system 220. As an example, in one or more arrangements, the sensor data 219 can include information on one or more LIDAR sensors 224 of the sensor system 220.

As noted above, the vehicle 200 can include the sensor system 220. The sensor system 220 can include one or more sensors. "Sensor" means any device, component and/or system that can detect, and/or sense something. The one or more sensors can be configured to detect, and/or sense in real-time. In arrangements in which the sensor system 220 includes a plurality of sensors, the sensors can function independently from each other. Alternatively, two or more of the sensors can work in combination with each other. In such a case, the two or more sensors can form a sensor network. The sensor system 220 and/or the one or more sensors can be operably connected to the processor(s) 210, the data store(s) 215, and/or another element of the vehicle 200 (including any of the elements shown in FIG. 2). The sensor system 220 can acquire data of at least a portion of the external environment of the vehicle 200 (e.g., nearby vehicles).

The sensor system 220 can include any suitable type of sensor. Various examples of different types of sensors will be described herein. However, it will be understood that the implementations are not limited to the particular sensors described. The sensor system 220 can include one or more vehicle sensors 221. The vehicle sensor(s) 221 can detect, determine, and/or sense information about the vehicle 200 itself. In one or more arrangements, the vehicle sensor(s) 221 can be configured to detect, and/or sense position and orientation changes of the vehicle 200, such as, for example, based on inertial acceleration. In one or more arrangements, the vehicle sensor(s) 221 can include one or more accelerometers, one or more gyroscopes, an inertial measurement unit (IMU), a dead-reckoning system, a global navigation satellite system (GNSS), a global positioning system (GPS), a navigation system 247, and/or other suitable sensors. The vehicle sensor(s) 221 can be configured to detect, and/or sense one or more characteristics of the vehicle 200. In one or more arrangements, the vehicle sensor(s) 221 can include a speedometer to determine a current speed of the vehicle 200.

Alternatively, or in addition, the sensor system 220 can include one or more environment sensors 222 configured to acquire, and/or sense driving environment data. "Driving environment data" includes any data or information about the external environment in which an autonomous vehicle is located or one or more portions thereof. For example, the one or more environment sensors 222 can be configured to detect, quantify and/or sense obstacles in at least a portion of the external environment of the vehicle 200 and/or information/data about such obstacles. The one or more environment sensors 222 can be configured to detect, measure, quantify and/or sense other things in the external environment of the vehicle 200, such as, for example, lane markers, signs, traffic lights, traffic signs, lane lines, crosswalks, curbs proximate the vehicle 200, off-road objects, etc.

Various examples of sensors of the sensor system 220 will be described herein. The example sensors may be part of the one or more environment sensors 222 and/or the one or more vehicle sensors 221. Moreover, the sensor system 220 can include operator sensors that function to track or otherwise monitor aspects related to the driver/operator of the vehicle 200. However, it will be understood that the implementations are not limited to the particular sensors described. As an example, in one or more arrangements, the sensor system 220 can include one or more radar sensors 223, one or more LIDAR sensors 224, one or more sonar sensors 225, and/or one or more cameras 226.

The vehicle 200 can further include a communication system 230. The communication system 230 can include one or more components configured to facilitate communication between the vehicle 200 and one or more communication sources. Communication sources, as used herein, refers to people or devices with which the vehicle 200 can communicate with, such as external networks, computing devices, operator or occupants of the vehicle 200, or others. As part of the communication system 230, the vehicle 200 can include an input system 231. An "input system" includes any device, component, system, element or arrangement or groups thereof that enable information/data to be entered into a machine. In one or more examples, the input system 231 can receive an input from a vehicle occupant (e.g., a driver or a passenger). The vehicle 200 can include an output system 232. An "output system" includes any device, component, or arrangement or groups thereof that enable information/data to be presented to the one or more communication sources (e.g., a person, a vehicle passenger, etc.). The communication system 230 can further include specific elements which are part of or can interact with the input system 231 or the output system 232, such as a display device 233, and one or more audio devices 234 (e.g., speakers and microphones).

The vehicle 200 can include one or more vehicle systems 240. Various examples of the one or more vehicle systems 240 are shown in FIG. 2. However, the vehicle 200 can include more, fewer, or different vehicle systems. It should be appreciated that although particular vehicle systems are separately defined, each or any of the systems or portions thereof may be otherwise combined or segregated via hardware and/or software within the vehicle 200. The vehicle 200 can include a propulsion system 241, a braking system 242, a steering system 243, throttle system 244, a transmission system 245, a signaling system 246, and/or a navigation system 247. Each of these systems can include one or more devices, components, and/or combinations thereof, now known or later developed.

The processor(s) 210, and/or the autonomous driving module(s) 250 can be operably connected to communicate with the various vehicle systems 240 and/or individual components thereof. For example, returning to FIG. 2, the processor(s) 210 and/or the autonomous driving module(s) 250 can be in communication to send and/or receive information from the various vehicle systems 240 to control the movement, speed, maneuvering, heading, direction, etc. of the vehicle 200. The processor(s) 210, the fueling verification system 370, and/or the autonomous driving module(s) 250 may control some or all of these vehicle systems 240 and, thus, may be partially or fully autonomous.

The vehicle 200 can include one or more modules, at least some of which are described herein. The modules can be implemented as computer-readable program code that, when executed by a processor 210, implement one or more of the various processes described herein. The processor 210 can be a device, such as a CPU, which is capable of receiving and executing one or more threads of instructions for the purpose of performing a task. One or more of the modules can be a component of the processor(s) 210, or one or more of the modules can be executed on and/or distributed among other processing systems to which the processor(s) 210 is operably connected. The modules can include instructions (e.g., program logic) executable by one or more processor(s)

210. Alternatively, or in addition, one or more data store 215 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 200 can include one or more autonomous driving module(s) 250. The autonomous driving module(s) 250 can be configured to receive data from the sensor system 220 and/or any other type of system capable of capturing information relating to the vehicle 200 and/or the external environment of the vehicle 200. In one or more arrangements, the autonomous driving module(s) 250 can use such data to generate one or more driving scene models. The autonomous driving module(s) 250 can determine the position and velocity of the vehicle 200. The autonomous driving module(s) 250 can determine the location of obstacles, or other environmental features including traffic signs, trees, shrubs, neighboring vehicles, pedestrians, etc.

Referring to FIG. 3, an example of a computing device 300 having the fueling verification system 260 is illustrated. The computing device 300 can be any appropriate type of computing device such as, but not limited to, a server, a personal computer (PC), workstation, embedded computer, or stand-alone device with a computational unit, such as a microprocessor, DSP (digital signal processor), FPGA (field programmable gate array), or ASIC (application-specific integrated circuit). Shown here, the computing device 300 is a server connected with a display device 320. While arrangements will be described herein with respect to servers, it will be understood that implementations are not limited to servers. In some implementations, the computing device 300 can be any other form of computing device that, for example, can receive data transmissions from one or more vehicles, send data transmissions to one or more vehicles, and can benefit from the functionality of the fueling verification system discussed herein.

The computing device 300 can have an input 302. The input 302 can be configured to send or receive information, such as in an electronic format. In one or more examples, the input 302 can be configured to obtain environmental information, obtain vehicular information, and/or for communication with other computing devices. The input 302 can include one or more connections, either wired or wireless, for use as an input device to the computing device 300. An input device can include any device capable of providing input to a computer in any fashion, including through the use of an intermediate device. The input 302 can be any suitable communication interface, which can be dependent on device type. Examples of interfaces for the input 302 can include, but are not limited to, USB (universal serial bus), Lightning, frame grabber, Ethernet, or Firewire.

The computing device 300 can further include one or more processor(s) 304, such as a general purpose processor, for use in the data processing and analysis described herein. The processor 304, which can also be referred to as a central processing unit (CPU), can be a device which is capable of receiving and executing one or more instructions to perform a task as part of a computing device. In one implementation, the processor(s) 304 can include a microprocessor such as an application-specific instruction set processor (ASIP), a graphics processing unit (GPU), a physics processing unit (PPU), a DSP, an image processor, a co-processor, or others.

Though referenced as the processor 304 at one or more points throughout the specification, it is understood that one or more processor(s) 304 can be used in one or more implementations described herein, including combinations of processors 304. In some implementations, the input 302 can be connected with sensors 306 (e.g., the sensor system 220 of the vehicle 200, sensors available via infrastructure, etc.), microphones, or other active or passive input devices or systems. In further implementations, the computing device 300 can include a connection 308. The connection 308, which can be wired or wireless, can allow the computing device 300 to communicate with other computing devices, locally or remotely, such as over a network protocol (e.g., Ethernet or similar protocols). The connection 308 can further be connected with remote devices associated with other computing devices, such as the sensors system 220 and the data store 215 as described with reference to the vehicle 200.

The computing device 300 can further comprise memory, such as memory 310. The memory 310 can include volatile and/or non-volatile memory. Examples of suitable memory 310 include RAM, flash memory, ROM EPROM (Erasable Programmable Read-Only Memory), EEPROM (Electrically Erasable Programmable Read-Only Memory), registers, magnetic disks, optical disks, hard drives, or any other suitable storage medium, or any combination thereof. The memory 310 can be a component of the processor(s) 304, or the memory 310 can be operably connected to the processor(s) 304 for use thereby. The memory 310 can include one or more modules that include computer-readable instructions that, when executed by the processor 304, cause the processor 304 to perform methods and functions that are discussed herein. The memory 310 can include one or more databases or portions thereof. The memory 310 can further contain information related to a reference material for comparison and/or analysis purposes.

The computing device 300 can also include an output 312 for conveying or transmitting output in a fashion which is usable by the vehicle 200, a requesting device, a connected device, a user. In one or more implementations, the output 312 is a video display, a speaker, a projector, an appropriate connection for any of the above devices, or other output devices or connections. In one or more examples, the output 312 can convey output to a screen for convenient viewing (e.g., display device 320) or to a control device. Though the input 302 and the output 312 are presented here as separate elements of the computing device 300, it is understood that, in one or more implementations, the input 302 and the output 312 can be the same device, connection or system, as desired.

The computing device 300 further includes the fueling verification system 260 that is implemented to perform methods and other functions as disclosed herein relating to reputation-based device communications. The fueling verification system 260 includes a plurality of modules to perform the functions described herein, including a detection module 420, a communication module 430 and an evaluation module 440. In one or more implementations, the fueling verification system 260 can communicate via a wired or wireless connection, depicted as a network 270, with local or remote devices, such as to receive information regarding the requesting device, connected devices, consulting systems, or others.

In one or more implementations, the fueling verification system 260 can communicate with the vehicle 200, with a server 272, with another computing device 300, or combinations thereof. Further, the fueling verification system 260 can affect communication within the computing device 300, such as between one or more connected devices to correlate registration parameters and functionality as discussed herein. The fueling verification system 260 can be in communication with the blockchain to approve and assign the connection between the one or more requesting devices, the one or more connected devices, and/or the vehicle 200 to provide an established connection, as described herein.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-7, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by or in connection with an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspects. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A fueling verification system for corroboration of vehicle fueling, comprising:
   one or more processors; and
   a memory communicably coupled to the one or more processors and storing:
      a detection module including instructions that when executed by the one or more processors cause the one or more processors to collect a first fuel measure for a fueling process from a delivery source, the first fuel measure being incorporated into a blockchain;
      a communication module including instructions that when executed by the one or more processors cause the one or more processors to collect a second fuel measure for a fueling process from a recipient source, the second fuel measure being incorporated into the blockchain; and
      an evaluation module including instructions that when executed by the one or more processors cause the one or more processors to compare the first fuel measure and the second fuel measure to determine a fueling offset, to present a plurality of compensation options to the delivery source, the recipient source, and/or a related controlling party, to receive an input of a selected one of the plurality of compensation options from the delivery source, the recipient source, and/or the related controlling party, to compensate the delivery source, the recipient source, and/or the related controlling party based on the fueling offset, the plurality of compensation options including two or more of: currency, goods, virtual currency, or discounts, and to shut down the fueling process if the fueling offset is beyond a critical value indicating possible harm or injury related to the fueling process.

2. The fueling verification system of claim 1, wherein the delivery source is a fueling station and the recipient source is a vehicle, and wherein the blockchain contains vehicle identity information and vehicle payment information as related to the vehicle.

3. The fueling verification system of claim 2, and wherein the communication module further comprises instructions to collect a history of the fueling offset for the vehicle in comparison to other fueling stations for use in calibrating one or more sensors of the vehicle.

4. The fueling verification system of claim 1, wherein the evaluation module further comprises instructions to apply the first fuel measure, the second fuel measure and the fueling offset to calibrate a measuring system for the delivery source.

5. The fueling verification system of claim 1, wherein the evaluation module further comprises instructions to determine a fueling station status for the delivery source that is a fueling station using at least one of the first fuel measure, the second fuel measure, and the fueling offset, the fueling station status being the ability of a fueling station to deliver fuel, and indicating whether the fueling station is presently experiencing errors that cause misdelivery.

6. The fueling verification system of claim 1, wherein the communications module further comprises instructions to receive a fueling queue request from one or more vehicles, the fueling queue request being a request from the one or more vehicles to enter a queue for refueling, and initiating a fueling process according to the queue.

7. The fueling verification system of claim 1, wherein the communications module further comprises instructions to record the first fuel measure and the second fuel measure in real-time as one or more blocks in the blockchain.

8. A non-transitory computer-readable medium for corroboration of vehicle fueling and storing instructions that when executed by one or more processors cause the one or more processors to:
  collect a first fuel measure for a fueling process from a delivery source, the first fuel measure being incorporated into a blockchain;
  collect a second fuel measure for a fueling process from a recipient source, the second fuel measure being incorporated into the blockchain;
  in response to collecting the second fuel measure, compare the first fuel measure and the second fuel measure to determine a fueling offset;
  present a plurality of compensation options to the delivery source, the recipient source, and/or a related controlling party, the plurality of compensation options including two or more of: currency, goods, virtual currency, or discounts;
  receive an input of a selected one of the plurality of compensation options from the delivery source, the recipient source, and/or the related controlling party;
  compensate the delivery source, the recipient source, and/or the related controlling party based on the fueling offset; and
  shut down the fueling process if the fueling offset is beyond a critical value indicating possible harm or injury related to the fueling process.

9. The non-transitory computer-readable medium of claim 8, further comprising instructions to collect a history of the fueling offset for the recipient source in comparison to other delivery sources for use in calibrating a sensor system of the recipient source.

10. The non-transitory computer-readable medium of claim 8, further comprising instructions to apply the first fuel measure, the second fuel measure and the fueling offset to calibrate a measuring system for the delivery source.

11. The non-transitory computer-readable medium of claim 8, further comprising instructions to determine a fueling station status for the delivery source that is a fueling station using at least one of the first fuel measure, the second fuel measure, and the fueling offset, the fueling station status being the ability of a fueling station to deliver fuel, and indicating whether the fueling station is presently experiencing errors that cause misdelivery.

12. The non-transitory computer-readable medium of claim 8, further comprising instructions to receive a fueling queue request from one or more vehicles, the fueling queue request being a request from the one or more vehicles to enter a queue for refueling, and initiating a fueling process according to the queue.

13. The non-transitory computer-readable medium of claim 8, further comprising instructions to record the first fuel measure and the second fuel measure in real-time as one or more blocks in the blockchain.

14. A method for corroboration of vehicle fueling, comprising:
  collecting, in a blockchain, a first fuel measure for a fueling process from a delivery source;
  collecting, in the blockchain, a second fuel measure for the fueling process from a recipient source;
  in response to collecting the second fuel measure, comparing the first fuel measure and the second fuel measure to determine a fueling offset;
  present a plurality of compensation options to the delivery source, the recipient source, and/or a related controlling party, the plurality of compensation options including two or more of: currency, goods, virtual currency, or discounts;
  receive an input of a selected one of the plurality of compensation options from the delivery source, the recipient source, and/or the related controlling party;
  compensating the delivery source, the recipient source, and/or the related controlling party based on the fueling offset; and
  in response to the fueling offset being beyond a critical value indicating possible harm or injury related to the fueling process, shutting down the fueling process, by one or more processors.

15. The method of claim 14, further comprising applying the first fuel measure, the second fuel measure and the fueling offset to calibrate a measuring system for the delivery source.

16. The method of claim 14, further comprising determining a fueling station status for the delivery source that is a fueling station using at least one of the first fuel measure, the second fuel measure, and the fueling offset, the fueling station status being the ability of a fueling station to deliver fuel and indicating whether the fueling station is presently experiencing errors that cause misdelivery.

17. The method of claim 14, further comprising receiving a fueling queue request from one or more vehicles, the fueling queue request being a request from the one or more vehicles to enter a queue for refueling, and initiating a fueling process according to the queue.

* * * * *

UNITED STATES PATENT AND TRADEMARK OFFICE
CERTIFICATE OF CORRECTION

| | |
|---|---|
| PATENT NO. | : 11,636,491 B2 |
| APPLICATION NO. | : 16/247980 |
| DATED | : April 25, 2023 |
| INVENTOR(S) | : Mark A. McClung et al. |

It is certified that error appears in the above-identified patent and that said Letters Patent is hereby corrected as shown below:

On the Title Page

Item (73) In the Assignee field: delete "Toyota Motor Engineering & Manufacturing North America, Inc.," and insert --Toyota Motor North America, Inc.,--

Signed and Sealed this
Fourth Day of July, 2023

Katherine Kelly Vidal
*Director of the United States Patent and Trademark Office*